United States Patent [19]

Tahiliani

[11] Patent Number: 4,487,746

[45] Date of Patent: Dec. 11, 1984

[54] ARC BY-PRODUCTS EVACUATION AND NEUTRALIZATION SYSTEM

[75] Inventor: Vasu H. Tahiliani, San Jose, Calif.

[73] Assignee: Electric Power Research Institute, Palo Alto, Calif.

[21] Appl. No.: 467,276

[22] Filed: Feb. 17, 1983

Related U.S. Application Data

[63] Continuation of Ser. No. 285,040, Jul. 20, 1981, abandoned.

[51] Int. Cl.³ .............................................. B01F 3/04
[52] U.S. Cl. ...................... 422/170; 15/320; 55/247; 55/248; 55/255; 55/259; 219/271; 219/275; 261/93; 261/119 R; 261/121 R; 261/142; 422/124; 422/125; 422/174
[58] Field of Search ............ 261/91, 93, 142, 119 R, 261/121 R; 55/223, 244, 247, 248, 255, 256, 259, 269; 422/123, 124, 170, 173, 174, 62, 125; 15/320, 349, 353, 404; 219/271–275

[56] References Cited

U.S. PATENT DOCUMENTS

| | | |
|---|---|---|
| 1,168,175 | 1/1916 | Deardorff . |
| 1,952,269 | 3/1934 | Lundquist .............................. 261/91 |
| 2,527,015 | 10/1950 | Lhota ..................................... 261/91 |
| 3,307,334 | 3/1967 | Jamison et al. .................... 261/91 X |
| 3,364,371 | 1/1968 | Greber . |
| 3,504,481 | 4/1970 | Zakarian et al. ............ 261/121 R X |
| 3,528,781 | 9/1970 | Gelfman et al. .................... 261/91 X |
| 3,638,861 | 2/1972 | Nikel .................................. 261/91 X |
| 3,656,209 | 4/1972 | Kinser ..................................... 15/349 |
| 3,713,987 | 1/1973 | Low ..................................... 15/404 X |
| 3,768,981 | 10/1973 | Alliger ................................ 55/255 X |
| 3,829,071 | 8/1974 | Valbona et al. ................... 261/91 X |
| 3,864,440 | 2/1975 | Giocoechea ..................... 261/142 X |
| 3,936,283 | 2/1976 | Solis ................................... 261/91 X |
| 3,957,467 | 5/1976 | Kim ..................................... 55/256 |
| 3,987,133 | 10/1976 | Andra .............................. 261/142 X |
| 4,155,977 | 5/1979 | Baker ............................... 422/170 X |
| 4,172,710 | 10/1979 | Van Der Molen ............... 15/353 X |
| 4,172,865 | 10/1979 | Steier ........................... 261/119 R X |

Primary Examiner—Richard L. Chiesa
Attorney, Agent, or Firm—Flehr, Hohbach, Test, Albritton & Herbert

[57] ABSTRACT

An arc by-product evacuation and neutralization system is disclosed. The system includes a vacuum cleaner having an input port for receiving air containing powdery arc by-products. The vacuum cleaner also includes a non-corrosive plastic tank containing an alkaline solution for neutralizing the powdery arc by-products. The neutralization is achieved by jet action causing the alkaline solution to be agitated thereby absorbing the powdery arc by-products.

4 Claims, 2 Drawing Figures

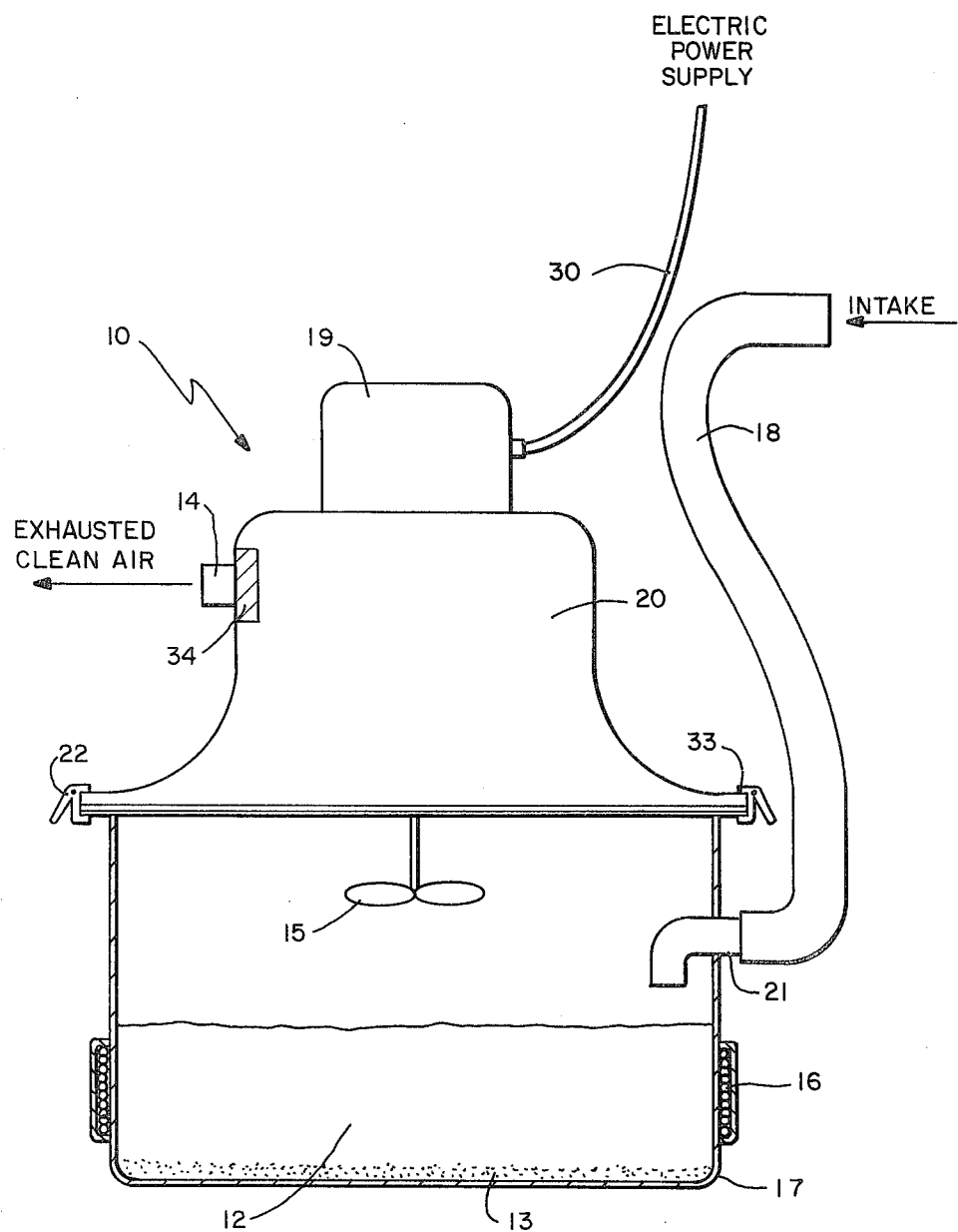
FIG.—1

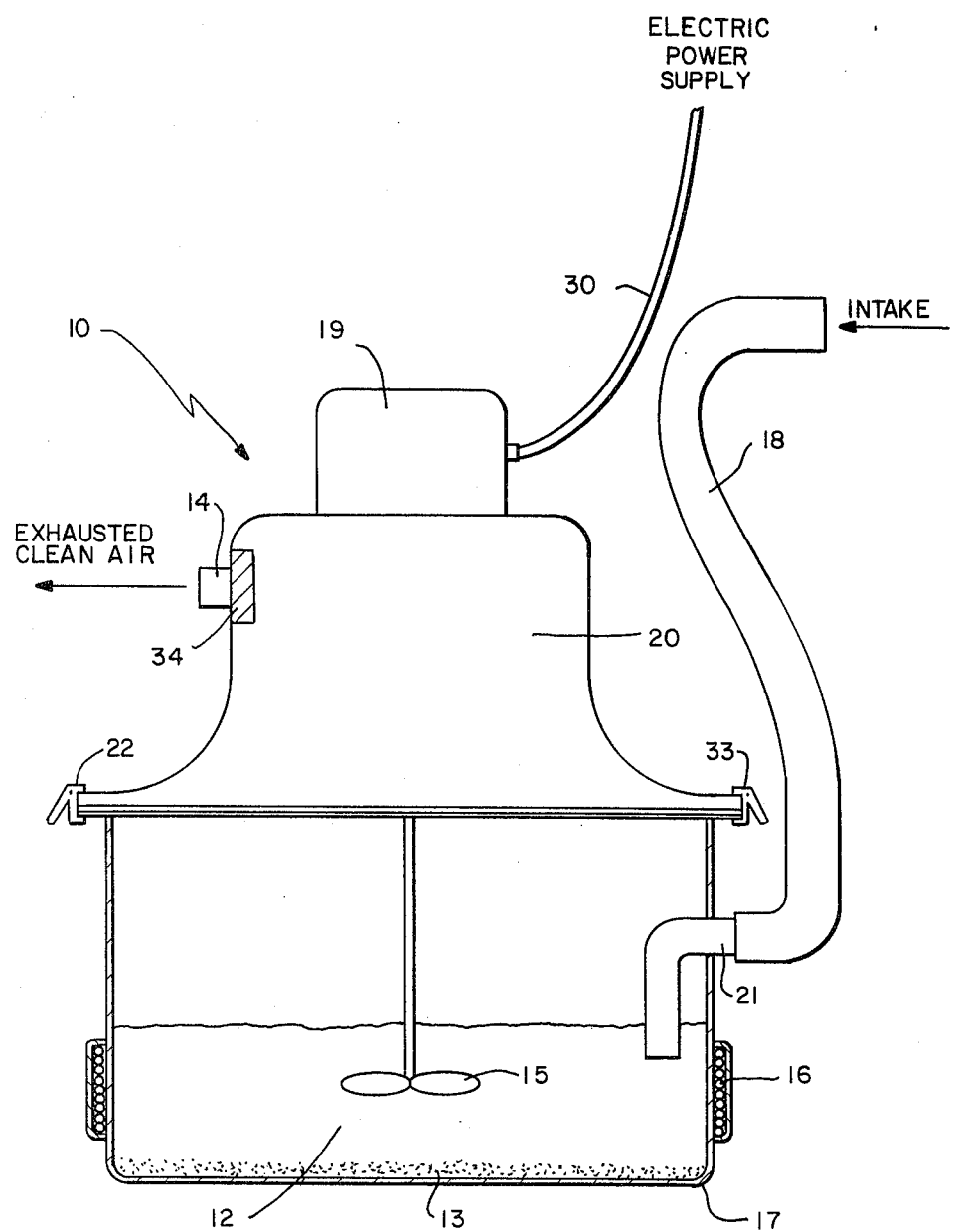
FIG.—2

ARC BY-PRODUCTS EVACUATION AND NEUTRALIZATION SYSTEM

This is a continuation of application Ser. No. 285,040 filed July 20, 1981, and now abandoned.

The present invention relates to an evacuation and neutralization system for arc by-products in $SF_6$ gas insulated electrical equipment.

Sulfur-hexafluoride ($SF_6$) has been used in circuit breakers for many years for its superior arc extinguishing capability as well as insulating properties, and there is now increasing use of this insulating gas for other substation components and gas insulated transmission lines. Corrosive and potentially toxic by-products can be produced by arcing within such $SF_6$ filled electrical equipment. For example, circuit breakers routinely experience arcs through closing and opening operations. Also, any of this equipment may experience dielectric failure resulting in arcing in the gas. Upon cessation of such arcs, rapid recombination of the majority of the constituents so generated does occur. However, certain solid by-products formed through chemical reaction with the metallic components in the equipment remain outside of the recombination action and generally deposit to the bottom of the equipment.

Of all the solid by-products formed through arcing, aluminum fluoride is found in most abundance, and thus happens to be of major concern. Generally, this chemical is found as a very fine powdery substance with the majority of the particles smaller than one micron size.

When any electrical switching equipment is opened either for maintenance and/or repair, the most common method of cleaning this powder is to sweep it out with a disposable paper bag type vacuum cleaner. While this may be an effective cleanup method, a concern is that some of the fine powder may escape through the paper bag with the exhaust air from the vacuum cleaner. The resulting fine dust, most often invisible to the eye, is considered harmful to a person if breathed. Aluminum fluoride is extremely hygroscopic and will become hydrafluoric acid as it reacts with water. In addition to the health safety concern, the collected powder requires disposal in an environmentally acceptable manner.

In view of the above background, it is an objective of the present invention to provide an improved evacuation and neutralization system for arc by-products to minimize the risk of breathing the by-product particles as well as to provide means for suitable disposition.

SUMMARY OF THE INVENTION

The present invention relates to an evacuation and neutralization system which employs a vacuum cleaner having a liquid sump which includes an alkaline solution of soda lime and water. The soda lime is a known neutralization agent for arc by-products such as aluminum fluoride and other metal fluorides and sulfides.

In order to enhance the chemical reaction between the arc by-products, and the chosen rinsing agent, a heating element is incorporated outside the liquid container walls of the vacuum cleaner.

In accordance with the above summary, the present invention achieves the objective of providing an evacuation and neutralization system for arc by-products.

Other objects and features of the present invention will become apparent from the following detailed description of a preferred embodiment of the invention when taken in conjunction with the accompanying drawings.

BRIEF DESCRIPTION OF THE DRAWINGS

FIG. 1 depicts an evacuation and neutralization system according to the present invention.

FIG. 2 depicts an evacuation and neutralization system for another embodiment of the present invention.

DESCRIPTION OF THE DRAWINGS

FIG. 1 depicts an evacuation and neutralization system according to the present invention.

The system employs a vacuum cleaner 10 incorporating a liquid sump 12 instead of a commonly used disposable bag made from fibrous materials such as paper. Whereas commerically available devices prescribe filling a liquid sump with tap water for a domestic carpet sweeping purpose, the present invention utilizes an alkaline solution of soda lime (NaOH and CaO) and water. The soda lime is a known neutralizing agent for arc by-products such as aluminum fluoride and other metal fluorides and sulfides.

In order to enhance the chemical reaction between these arc by-products and the chosen rinsing agent soda lime, heating elements 16 are incorporated outside the liquid container walls 17. Vacuum pump 20, which includes motor 19 connected to power line 30, is mounted to tank 17 via clamps 32, 33. A jet action fan 15 is operatively coupled to a drive shaft of vacuum pump 20. Exhaust port 14 is provided in pump 20 to provide a means for exhausting clean air.

FIG. 1 depicts a sectionalized view of the heater element 16 wrapped around container 17. For best results it has been observed that the liquid should be maintained around 40° C.–60° C. which can easily be accomplished through a simple thermostatic control. Since arc by-products are known to be corrosive, all parts such as inlet hose 18, liquid tank 17, jet action fan 15 and exhaust port 14 should be made of corrosion resistant plastic materials.

The operation of the system of FIG. 1 is as follows:

The action of motor 19 draws air which is drawn from intake hose 18 through the input port 21. As the air sweeping the powdery arc by-products enters tank 17, the heavy powder is mixed with the churning liquid solution in sump 12. The churning action results from the jet action fan 15 coupled to the shaft of drive motor 19. The fan 15 also promotes mist action within the air volume above the liquid level in a similar manner as a common household humidifier.

The resulting mist wets the lighter arc by-product particles that may otherwise remain airborne and may perhaps escape through an output port such as exhaust port 14. The wetting action makes these particles heavy and promotes their settling into liquid solution 12. In order to safeguard against possible escape of trace quantities of arc by-products, a filter (34) containing activated alumina and dry soda lime may be incorporated within an output such as exhaust port 14.

The required quantity of soda lime can be introduced into water sump 12 before starting to evacuate. Assuming that all by-products are effectively neutralized, which can be checked with a simple litmus paper test, the liquid can then be disposed of without undue environmental concern.

Referring now to FIG. 2, another embodiment of the present invention is depicted which improves the efficiency of the evacuation and neutralization process.

FIG. 2 depicts an intake hose 18 extending via hose 21 into the liquid sump to maximize wetting of all the powdery arc by-products. The jet action fan 15 also extends into the liquid to thoroughly mix the solids into the liquid soda lime solution to prevent the solids from stagnating into a localized region.

The implementation in FIG. 2 minimizes the possibility of trace quantities of arc by-products escaping through the exhaust. However, filter 34 contaning an activated alumina and dry soda lime should be incorporated into exhaust port 14 as previously described.

The disclosed invention combines evacuation and neutralization procedures in a single effort in a manner not believed to have been achieved before.

The evacuation scheme cleanses the exhaust air thereby providing necessary safety to the personnel working around it as well as eliminating the exhaust that may contaminate the atmosphere. The system provides an improvement over existing neutralization schemes by employing external heating towards a more effective and complete neutralization process.

What is claimed is:

1. A powdery arc by-product evacuation and neutralization system comprising a vacuum cleaner type sweeper, said sweeper including a non-corrosive plastic tank containing an alkaline solution, said plastic tank having an input port extending completely into said alkaline solution, a vacuum pump mounted on the top of said tank for drawing corrosive powdery arc by-products through said input port such that said by-products are drawn completely into said alkaline solution, said vacuum pump including a jet action fan extending completely into said alkaline solution for causing said alkaline solution to be agitated such that said alkaline solution absorbs said powdery arc by-products thereby sweeping and chemically neutralizing said by-products in one step, said plastic tank including a heater element for heating said alkaline solution to a predetermined temperature range of approximately 40° C.-60° C. to bring about optimal chemical reaction, means for exhausting said cleansed air through said output port, said output port including a chemical filter to promote a chemical reaction and to prevent escape of trace quantities of said undesirable arc by-products.

2. A powdery arc-by product evaucation and neutralization system comprising a vacuum cleaner having a liquid containing an alkaline solution of soda lime and water, said liquid sump having an input port extending completely into said alkaline solution, an exhaust port, a vacuum pump mounted on the top of said vacuum cleaner for drawing air and powdery arc by-products through said input port such that said by-products are drawn completely into said liquid sump, said vacuum pump including agitation means including a jet action fan extending completely into said alkaline solution for causing said alkaline solution to be agitated such that said alkaline solution absorbs said powdery arc by-products thereby sweeping and chemically neutralizing said by-products in one step, and means for exhausting the drawn air through said exhaust port, means for heating said alkaline solution to a predetermined temperature range of approximately 40° C.-60° C. to bring about optimal chemical reaction, wherein the components of said system are made of corrosion-resistant plastic materials and wherein said output port includes a filter containing activated alumina and dry soda lime for preventing escape of trace quantities of said by-products through said output port.

3. A powdery arc by-product evacuation and neutralization system comprising a vacuum cleaner having a non-corrosive plastic tank containing an alkaline solution, said plastic tank having an input port extending completely into said alkaline solution, an output port, a vacuum pump mounted on the top of said tank for drawing air and sweeping powdery arc by-products through said input port such that said by-products are drawn completely into said alkaline solution, said vacuum pump including a jet action fan extending completely into said alkaline solution for causing said alkaline solution to be agitated so that said alkaline solution absorbs said powdery arc by-products for chemically reacting with and thereby sweeping and chemically neutralizing said by-products in one step, said plastic tank including a heater element for heating said alkaline solution to a predetermined temperature range of approximately 40° C.-60° C. to bring about optimal chemical reaction, means for exhausting said air through said output port, said output port including a chemical filter to promote a chemical reaction and prevent escape of trace quantities of said undesirable arc by-products.

4. A powdery arc by-product evacuation and neutralization system comprising a vacuum cleaner having a non-corrosive plastic tank containing an alkaline solution, said plastic tank having an input port extending completely into said alkaline solution, an output port, a vacuum pump mounted on the top of said tank for sweeping powdery arc by-products through said input port such that said by-products are drawn completely into said alkaline solution, said vacuum pump including agitation means comprising a jet action fan extending completely into said alkaline solution for causing said alkaline solution to be agitated so that said alkaline solution absorbs said powdery arc by-products thereby chemically neutralizing and sweeping said by-products in one step, said plastic tank including a heater element for heating said alkaline solution to a predetermined temperature of approximately 40° C.-60° C. to bring about optimal chemical reaction, means for exhausting said drawn air through said output port, said output port including a chemical filter containing activated alumina and dry soda lime to promote a chemical reaction and to prevent escape of trace quantities of said undesirable arc by-products.

* * * * *